United States Patent Office 3,194,531
Patented July 13, 1965

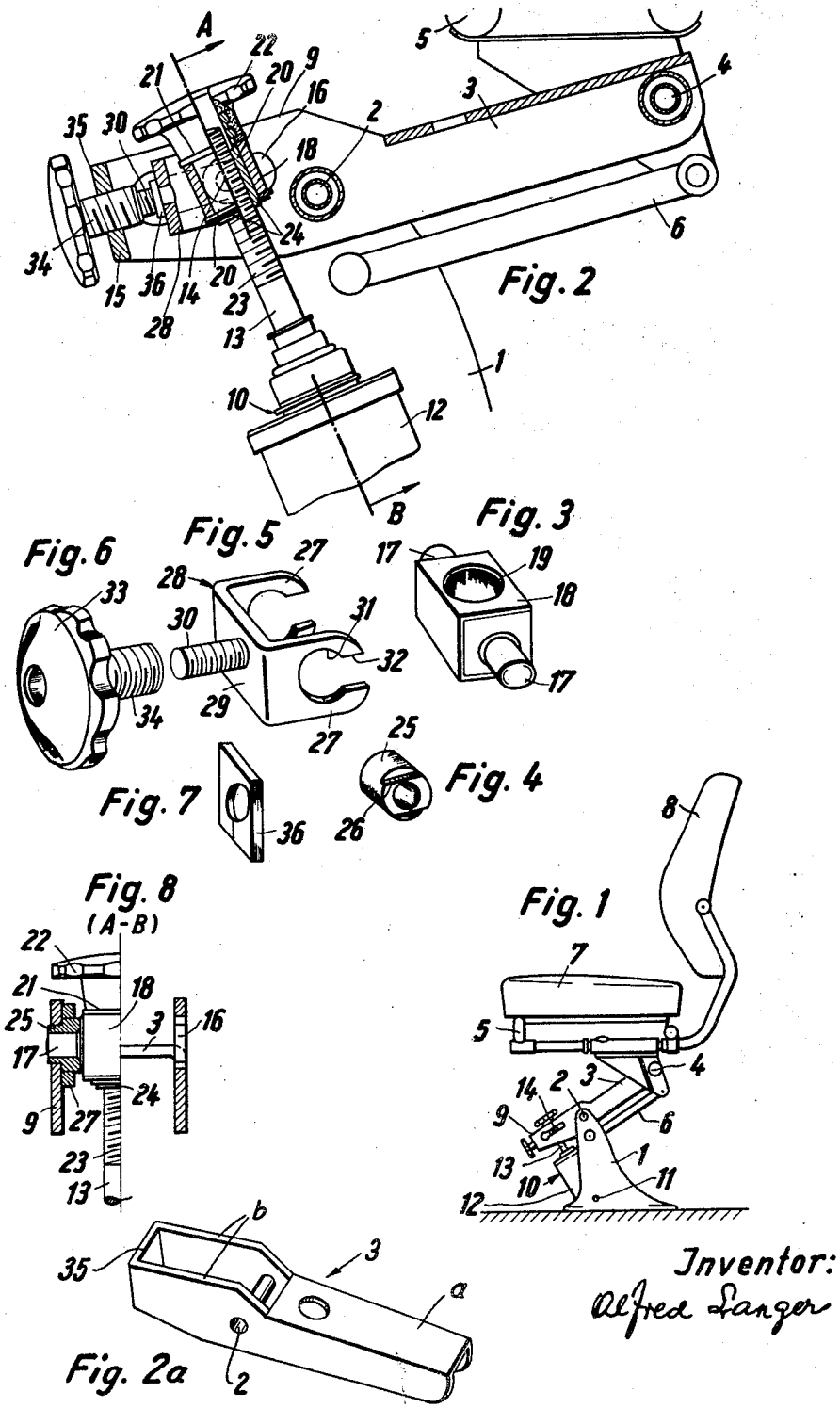

3,194,531
VEHICLE SEATS
Alfred Langer, Solingen, Germany, assignor to Bremshey & Co., Solingen-Ohligs, Germany
Filed Nov. 13, 1963, Ser. No. 323,352
Claims priority, application Germany, Nov. 24, 1962, B 51,292
13 Claims. (Cl. 248—421)

This invention relates to vehicle seats of the kind having a frame supported by a lever which is pivoted both to the frame and to a fixed underframe and is provided with a spring and shock-absorbing device which acts on the lever through a link rod that extends laterally away from the lever and is pivotally connected to it at a point spaced along the length of the lever from the pivotal connection between the lever and the fixed underframe. The pivotal connection between the link rod and the lever is adjustable transversely and longitudinally of the lever to adjust the height of the seat in its equilibrium position and to adjust the effective moment arm of the spring and shock-absorbing device respectively.

In conventional vehicle seats of this kind, the adjustment of the pivotal connection transversely of the lever is usually effected by means of a nut which is screwed onto the link rod which is partially constructed as a screw threaded spindle, the nut constituting a stop against which the lever is supported when loaded by the seat. For the adjustment of the pivotal connection along the lever, it is conventional to provide in the lever a series of notches along which the nut is displaced. This has the disadvantage that the adjustment is only possible by steps.

In accordance with the present invention, the pivotal connection between the link rod and the lever in a vehicle seat of the kind described is continuously adjustable both transversely and longitudinally of the lever by means of separate screw threaded spindles.

The lever may extend obliquely upwards to the seat frame from the underframe and form one link of a parallel linkage which guides the seat.

Preferably the pivotal connection between the link rod and the lever is provided by a block which slides longitudinally in the lever under the control of one spindle and which has a transverse bore through which the second spindle passes. The second spindle may then be a continuation of the link rod and may carry a control knob which prevents this spindle from being withdrawn through the block and which is rigidly fixed to a nut threaded on the spindle within the bore in the block. If the nut is then provided with a collar on the side of the block remote from the control knob the second spindle is positively located axially within the block. This arrangement avoids the problem with previous conventional constructions in which, if the seat is jolted excessively when travelling over uneven ground, there is a danger that the nut would be jerked out of the notch in which it engages.

One example of a vehicle seat constructed in accordance with the present invention is illustrated in the accompanying drawings, in which:

FIGURE 1 is a side elevation of the seat;
FIGURE 2 shows, on a larger scale, the essential parts of the seat frame;
FIGURE 2a is a perspective view, on a smaller scale, of the lever of the seat frame shown in FIG. 2;
FIGURES 3 to 7 are perspective exploded views of the individual parts of the adjusting mechanism; and,
FIGURE 8 is a section taken along the line A–B in FIGURE 2, the righthand half of the parts of the adjusting mechanism having been removed in order to show clearly the configuration of the lever.

The seat consists, of a pedestal 1 on which there is pivotally mounted, at 2, a lever 3, having an arm portion thereof, as shown on the right-hand side of FIG. 2, which is pivoted at 4 to a seat frame 5. The pedestal, lever and seat frame constitute three parts of a parallelogram linkage, the fourth element of which consists of a rod 6, the ends of which are pivoted to the pedestal and seat frame. The seat frame 5 supports a seat cushion 7 and a back cushion 8.

The lever 3 has an arm portion 9, shown at the lefthand side of FIG. 2, which is connected via a link-rod 10 to a pivot point 11 on the pedestal 1. The link-rod is constructed as a springing and shock-absorbing element in a manner which is shown in the case of seats of this type. The spring and shock-absorber are enclosed in a housing 12, out of which a spindle 13 extends. Under the static and dynamic load acting upon the seat, the tension of the spring in the housing 12 varies, so that the distance between the pivot 11 and a pivot 14 connecting the spring 13 to the arm 9 is also varied. The springing movements are damped by the shock-absorber which is also enclosed in the housing 12.

As shown in FIG. 2a, the lever 3 has a U-shaped section a on the righthand side of the pivot 2 and is bifurcate on the lefthand side, but the fork arms b are connected at the end by a web 15. There is space between the fork arm to accommodate the adjusting mechanism which will now be described.

A block 18 is mounted for sliding and for rotation about a horizontal axis by means of transverse studs 17 in two lonitudinal slots 16 of the lever arm 9. The block has a bore 19 which accommodates a nut 20. The nut is confined within the block 18 by a collar 21 and a circlip 24 mounted on the nut. The nut 20, which is rigidly fixed to a knob 22, is rotatable upon a section of the spindle 13 provided with a screwthread 23.

Cylindrical sliding pieces 25 are provided for mounting the transverse stubs 17 in the slots 16, and are slidable in the slots 16 by flattened parts 26. They are overlapped by the arms 27 of a fork element 28, the web 29 of which has welded into it a screwthreaded spindle 30 having a righthand screwthread. The arms 27 contain holes 31, the diameters of which correspond to the outside diameter of the sliding pieces 25. For assembly, the holes 31 are provided with slots 32, the width of which corresponds to the diameter of the studs 17.

Adjustment of the spindle 30 is provided by a nut 33 constructed as a rotary knob having an internal screwthread which receives the screwthread on the spindle 30. The nut 33 is provided externally with a lefthanded screwthread 34 which is received in a screwthreaded hole 35 in the web 15.

The seat height can be adjusted continuously by rotating the knob 22 since this varies the length of the link rod 13. The springing and shock-absorbing action is continuously adjustable by rotating the knob 33, since this affects the effective moment arm about the pivot 2, that is the distance between the pivots 14 and 2. The adjustable pivot 14 is positively located in its position at any time on the lever 9, and is therefore unable to change its position, even under the effect of travelling jolts.

When the nut 33 is rotated, it moves outwardly or inwardly in the web 15, and the spindle 30 then experiences a movement in the same direction relatively to the nut 33. Consequently a considerable adjustment travel is achieved with a small number of nut revolutions, without using a multiple-threaded and correspondingly expensive spindle.

In order to render it impossible for the nut 33 to be completely screwed out of the web 15, a circlip 36, which acts as stop is applied on the spindle 30 after assembly.

I claim:

1. Vehicle seat comprising a seat frame, a fixed underframe, and a lever pivotally connected by a first and second pivot, respectively, to said seat frame and said underframe, spring-biasing shock absorbing means including a link rod extending transversely to said lever, adjustable pivot means pivotally connecting said link rod to said lever at a location spaced from said second pivot in the longitudinal direction of said lever, and adjusting means for continuously adjusting said adjustable pivot means transversely and longitudinally with respect to said lever, said adjusting means comprising first and second screw threaded spindle means carried by said lever, said first spindle means being actuable for continuously displacing said adjustable pivot means in the longitudinal direction of said lever toward and away from said second pivot for continuously adjusting the effective moment arm of said shock absorbing means with respect to said second pivot, and said second spindle means being actuable for continuously displacing said adjustable pivot means in the transverse direction of said lever for continuously adjusting the level of said seat frame.

2. Seat according to claim 1, wherein said lever is upwardly inclined between said underframe and said seat and comprises one link of a parallelogram linkage system for guiding said seat frame.

3. Seat according to claim 1, wherein said adjustable pivot means comprises a block mounted on said lever and displaceable in the longitudinal direction of said lever by actuating said first spindle means, said block being formed with a transverse bore through which said second spindle means extends.

4. Seat according to claim 3, wherein said second spindle means comprises an extension of said link rod and carries a control knob of larger diameter than said transverse bore so as to prevent said second spindle means from being withdrawn through said block, said control knob being fixed to a nut threaded on said second spindle means and located within said transverse bore.

5. Seat according to claim 4, wherein said nut is formed with a collar located on a side of said block distant from said control knob for positively locating said second spindle means axially within said block.

6. Seat according to claim 3, wherein said lever has a bifurcated portion comprising a pair of parallel arms formed with opposing slots extending in the longitudinal direction of said lever, said block having a pair of end trunnions extending transversely to said transverse bore and slidably received in said longitudinal slots.

7. Seat according to claim 6, including a forked element comprising a web portion and a pair of parallel arms, said first spindle means being carried by said web, and said parallel arms having means for embracing said trunnions, whereby said block is connected to said first spindle means.

8. Seat according to claim 6, including a pair of hollow sleeves within which said trunnions are received, said sleeves being formed with a pair of substantially parallel flats slidably received in said longitudinal slots for preventing rotation of said sleeves.

9. Seat according to claim 8, including a forked element comprising a web portion carrying said first spindle means and a pair of parallel arms formed with opposing substantially circular holes having a diameter at least equal to the diameter of said sleeves, said arms being also formed with a slot extending from the free ends thereof to said holes, the width of said slots corresponding to the diameter of said trunnions whereby said forked element can be operatively connected to said block by sliding said slots over said trunnions and said sleeves into said holes.

10. Vehicle seat comprising a seat frame, a fixed underframe, and a lever pivotally connected by a first and second pivot, respectively, to said seat frame and said underframe, spring-biasing shock absorbing means including a link rod extending transversely to said lever, adjustable pivot means pivotally connecting said link rod to said lever at a location spaced from said second pivot in the longitudinal direction of said lever, and adjusting means for continuously adjusting said adjustable pivot means transversely and longitudinally with respect to said lever, said adjusting means comprising first and second screw threaded spindle means carried by said lever, said first spindle means being actuable for continuously displacing said adjustable pivot means in the longitudinal direction of said lever toward and away from said second pivot for continuously adjusting the effective moment arm of said shock absorbing means with respect to said second pivot, and said second spindle means being actuable for continuously displacing said adjustable pivot means in the transverse direction of said lever for continuously adjusting the level of said seat frame, said first spindle means carrying a nut having an internal thread cooperating with the thread of said first spindle means, said nut being formed with an external thread of opposite hand to the internal thread thereof, said nut extending through a bore in a web portion of said lever, said bore having an internal thread engaging with the external thread of said nut, a control knob carried by said nut on the outside of said bore, said control knob being turnable for displacing said block in the longitudinal direction of said lever, said first spindle means being displaceable relative to said nut in the same direction as said nut is displaceable relative to said lever.

11. Vehicle seat comprising a seat frame, a fixed underframe, and a lever pivotally connected by a first and second pivot, respectively, to said seat frame and said underframe, spring-biasing shock absorbing means including a link rod extending transversely to said lever, adjustable pivot means pivotally connecting said link rod to said lever at a location spaced from said second pivot in the longitudinal direction of said lever, said adjustable pivot means having a pivot axis extending substantially parallel to the pivot axes of said first and second pivots, first adjustable spindle means carried by said lever and being turnably displaceable along an axis extending in the longitudinal direction of said lever and being operatively engageable with said adjustable pivot means for continuously displacing said pivot axis of said adjustable pivot means in the longitudinal direction of said lever toward and away from said second pivot so as to continuously adjust the moment arm between said shock absorbing device and said second pivot, and second adjustable spindle means carried by said lever and being turnably displaceable along an axis extending transversely to the longitudinal direction of said lever and to the pivot axis of said adjustable pivot means and being operatively engageable with said adjustable pivot means for continuously displacing said pivot axis of said adjustable pivot means along the displacement axis of said second adjustable spindle means so as to continuously adjust the level of said seat frame.

12. Seat according to claim 11, wherein the displacement axis of said first adjustable spindle means intersects the displacement axis of said second adjustable spindle means and the pivot axis of said adjustable pivot means.

13. Seat according to claim 11, wherein the pivot axis of said adjustable pivot means and the displacement axes of said first and second adjustable spindle means intersect at a common point.

References Cited by the Examiner

UNITED STATES PATENTS 2,667,209   1/54   Gundersen _____ 248—421
2,894,562   7/59   Peller _____ 248—421

CLAUDE A. LE ROY, *Primary Examiner.*